United States Patent
Park

(10) Patent No.: US 10,146,200 B2
(45) Date of Patent: Dec. 4, 2018

(54) APPARATUS AND METHOD FOR UPDATING OPERATING SYSTEM IN PROGRAMMABLE LOGIC CONTROLLER

(71) Applicant: LSIS CO., LTD., Anyang-si, Gyeonggi-do (KR)

(72) Inventor: Jo Dong Park, Cheonan-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 765 days.

(21) Appl. No.: 14/465,526

(22) Filed: Aug. 21, 2014

(65) Prior Publication Data
US 2015/0066168 A1    Mar. 5, 2015

(30) Foreign Application Priority Data
Aug. 29, 2013    (KR) .................. 10-2013-0102920

(51) Int. Cl.
G06F 8/656    (2018.01)
G05B 19/05    (2006.01)
G06F 13/16    (2006.01)

(52) U.S. Cl.
CPC .......... *G05B 19/056* (2013.01); *G06F 8/656* (2018.02); *G06F 13/1668* (2013.01); *G05B 2219/25346* (2013.01)

(58) Field of Classification Search
CPC .................. G05B 19/05; G05B 19/056; G05B 2219/13003; G05B 2219/13004; G05B 2219/25346; G06F 8/65; G06F 8/665; G06F 8/67
USPC .......................................................... 700/86
See application file for complete search history.

(56) References Cited

U.S. PATENT DOCUMENTS

| | | | | |
|---|---|---|---|---|
| 1,459,516 A | * | 6/1923 | Rohlin | F22D 5/12 137/263 |
| 4,631,707 A | * | 12/1986 | Watanabe | G01R 19/16557 365/226 |
| 5,452,339 A | * | 9/1995 | Siu | G06F 8/71 379/15.03 |
| 5,544,121 A | * | 8/1996 | Dosaka | G11C 7/10 365/222 |
| 6,023,620 A | * | 2/2000 | Hansson | G06F 8/65 455/419 |

(Continued)

FOREIGN PATENT DOCUMENTS

| | | |
|---|---|---|
| CN | 101063939 | 10/2007 |
| CN | 101295255 | 10/2008 |

(Continued)

OTHER PUBLICATIONS

State Intellectual Property Office of the People's Republic of China Application U.S. Appl. No. 201410534400.0, Office Action dated Sep. 26, 2016, 8 pages.

(Continued)

*Primary Examiner* — Jason D Mitchell
(74) *Attorney, Agent, or Firm* — K&L Gates LLP

(57) ABSTRACT

The present disclosure relates to an apparatus for updating an OS (Operating System) in PLC (Programmable Logic Controller) configured to update an OS in a PLC, and to perform an operation by instantly applying the updated OS to the PLC, and a method using the same, the apparatus including an MPU (Micro Processing Unit), a flash memory, a second working memory, and a switching unit.

8 Claims, 6 Drawing Sheets

(56) References Cited

U.S. PATENT DOCUMENTS

| | | | | |
|---|---|---|---|---|
| 6,205,513 | B1* | 3/2001 | Godicke | G06F 8/65 710/240 |
| 6,446,158 | B1* | 9/2002 | Karabatsos | G06F 13/4243 365/194 |
| 6,788,592 | B2* | 9/2004 | Nakata | G11C 8/16 365/189.15 |
| 7,120,909 | B1* | 10/2006 | Shibuya | G06F 8/60 455/419 |
| 7,577,726 | B1* | 8/2009 | Conard | G06F 8/665 709/221 |
| 7,742,401 | B2* | 6/2010 | Eilers | H04L 41/0663 370/216 |
| 8,171,271 | B2* | 5/2012 | Huang | G06F 8/665 713/1 |
| 8,892,917 | B2* | 11/2014 | Sukegawa | G06F 1/3225 713/320 |
| 9,035,444 | B2* | 5/2015 | Sato | H01L 25/0657 257/686 |
| 2003/0095648 | A1* | 5/2003 | Kaib | A61B 5/0006 379/106.02 |
| 2009/0125124 | A1* | 5/2009 | Premerlani | G05B 19/054 700/18 |
| 2011/0137435 | A1* | 6/2011 | Furusawa | G05B 19/0426 700/86 |
| 2011/0307879 | A1* | 12/2011 | Ishida | G06F 8/68 717/170 |

FOREIGN PATENT DOCUMENTS

| | | |
|---|---|---|
| CN | 101739270 | 6/2010 |
| CN | 101807154 | 8/2010 |
| CN | 102331734 | 1/2012 |
| CN | 102334100 | 1/2012 |
| CN | 102968089 | 3/2013 |
| CN | 103124938 | 5/2013 |
| JP | 2012-194793 | 10/2012 |
| KR | 10-2007-0015704 | 2/2007 |

OTHER PUBLICATIONS

Korean Intellectual Property Office Application Serial No. 10-2013-0102920, Office Action dated Jul. 29, 2016, 4 pages.

* cited by examiner

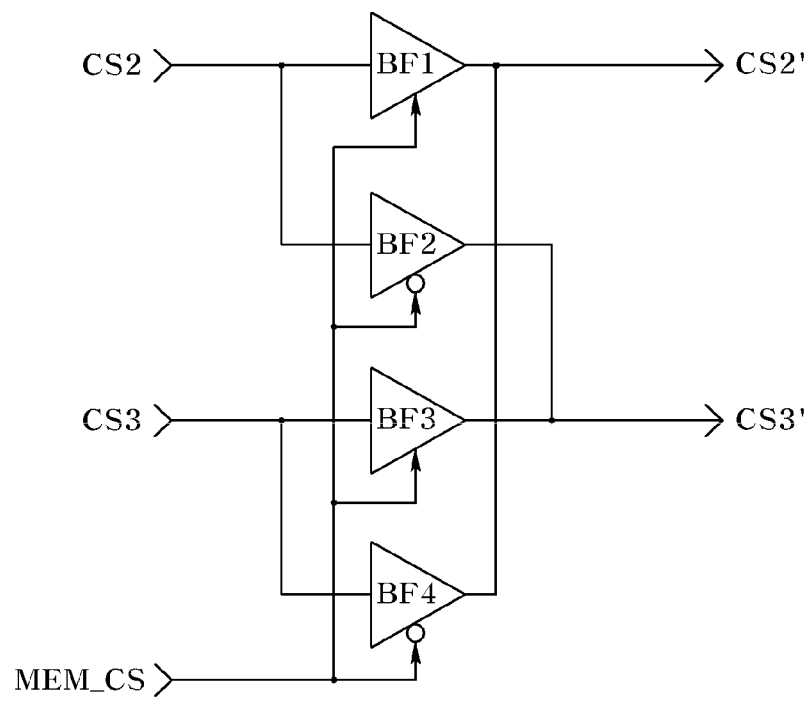

FIG. 5A

| CS SIGNAL | ADDRESS AREA |
|---|---|
| CS1 | 0x000000 ~ 0x0FFFFF |
| CS2 | 0x100000 ~ 0x1FFFFF |
| CS3 | 0x200000 ~ 0x2FFFFF |
| CS4 | 0x300000 ~ 0x3FFFFF |
| CS5 | 0x400000 ~ 0x4FFFFF |
| CS6 | 0x500000 ~ 0x5FFFFF |

FIG. 5B

|  | FIRST WORKING MEMORY | SECOND WORKING MEMORY |
|---|---|---|
| MEM_CS=1 | CS2<br>0x200000 ~ 0x2FFFFF | CS3<br>0x300000 ~ 0x3FFFFF |
| MEM_CS=0 | CS3<br>0x300000 ~ 0x3FFFFF | CS2<br>0x200000 ~ 0x2FFFFF |

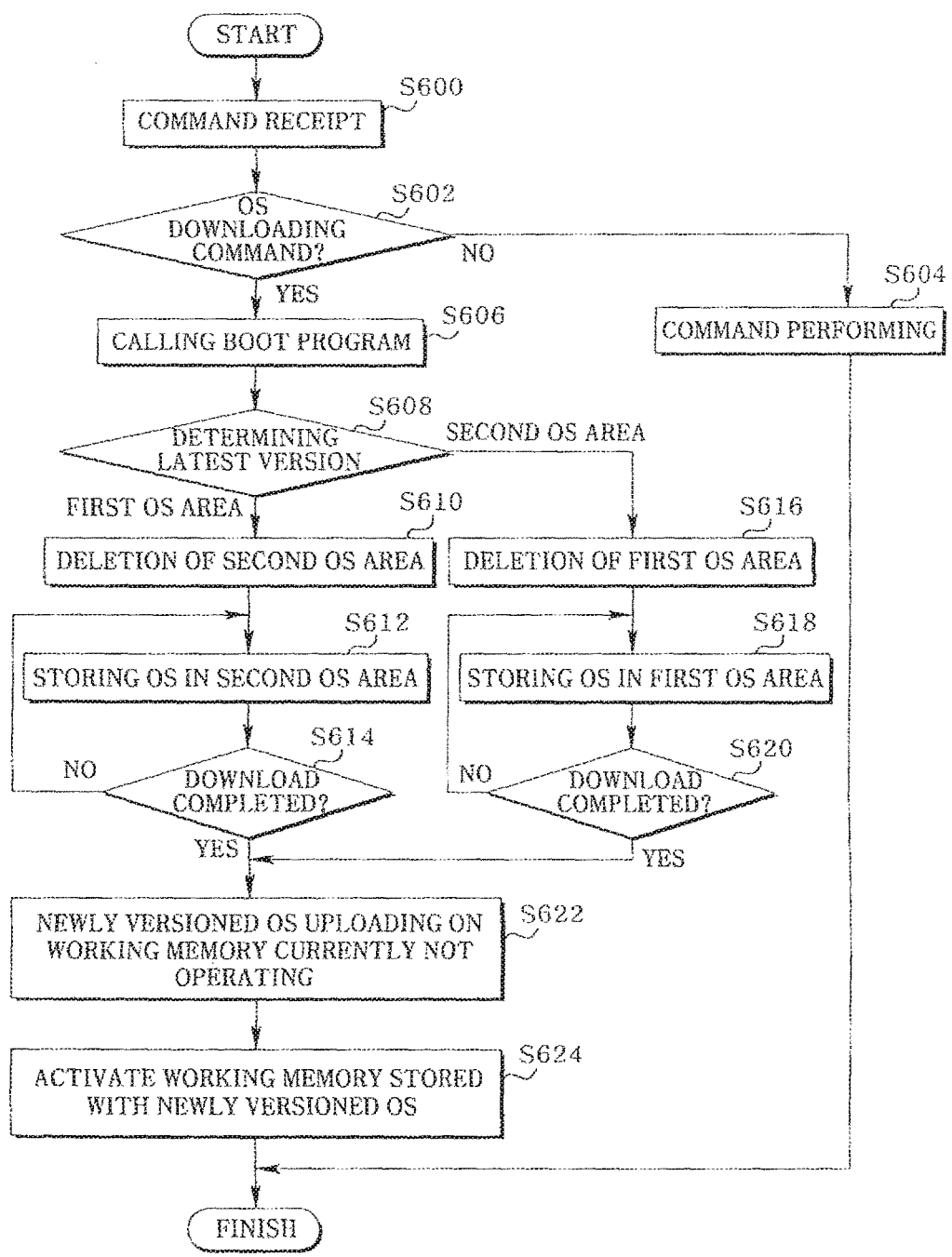

APPARATUS AND METHOD FOR UPDATING OPERATING SYSTEM IN PROGRAMMABLE LOGIC CONTROLLER

CROSS-REFERENCE TO RELATED APPLICATIONS

Pursuant to 35 U.S.C. § 119(a), this application claims the benefit of earlier filing date and right of priority to Korean Patent Application No. 10-2013-0102920, filed on Aug. 29, 2013, the contents of which are all hereby incorporated by reference herein in its entirety.

BACKGROUND OF THE DISCLOSURE

Field of the Disclosure

The present disclosure relates to an apparatus for updating an OS (Operating System) in PLC (Programmable Logic Controller) configured to update an OS in a PLC, and to perform an operation by instantly applying the updated OS to the PLC, and a method using the same.

Discussion of the Related Art

The information disclosed in this Discussion of the Related Art section is only for enhancement of understanding of the general background of the present disclosure and should not be taken as an acknowledgement or any form of suggestion that this information forms the prior art already known to a person skilled in the art.

Various types of apparatuses have emerged for factory automation concomitant with development in automation fields due to sophisticated technologies. As one of apparatuses for factory automation, a PLC uses programmable memories for performing functions such as logics, sequences, timings, counts and operations through digital or analog (I/O) input/output modules. The PLC, an apparatus configured to control various devices, machineries and processes in a factory, is a core element for factory automation, and one of effective means configured to satisfy various requirements for factory automation.

The PLC can provide, in a module or in a basic unit, various functions such as four fundamental arithmetic operations, input/output of digital signals, input/output of analog signals, communication, position determination and high speed counts.

OS updates in PLC are frequently generated, even after products are shipped out from a factory, for functional upgrade, bug correction and functional addition, among others. In order to update the OS in PLC, and to allow the PLC to be operated according to an updated OS, power of PLC must be turned off and turned on again, or system reset must be performed to do the initialization, where OS updated in the initialization process is uploaded on a working memory and operation must be performed according to the updated OS.

Thus, conventionally, it takes many hours to update the OS on the PLC, and to allow the PLC to operate according to the updated OS, whereby productivity of products using the PLC is much decreased.

SUMMARY OF THE DISCLOSURE

This section provides a general summary of the disclosure, and is not a comprehensive disclosure of its full scope or all of its features. Exemplary aspects of the present disclosure are to substantially solve at least the above problems and/or disadvantages and to provide at least the advantages below.

Accordingly, an aspect of the present disclosure provides an apparatus for updating an OS (Operating System) in PLC configured to allow the PLC to instantly apply and operate an updated OS, instead of turning off and turning on again the power of PLC while the OS is updated on the PLC, and a method thereof.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided an apparatus for updating an OS (Operating System) in PLC, the apparatus comprising:

an MPU (Micro Processing Unit) configured to control download of the OS provided by a PADT (Programming And Debugging Tool) and to perform the operation in response to the uploaded OS;

a flash memory stored with a plurality of OSs downloaded in response to control of the MPU;

a first working memory uploaded with a latest versioned OS among the OSs stored in the flash memory in response to the control of the MPU;

a second working memory uploaded with the OS stored in the flash memory by download of the MPU subsequent to the latest versioned OS being uploaded on the first working memory; and a switching unit configured to switch chip select signals for respectively selecting the first working memory and the second working memory in response to a chip switching signal generated by the MPU and to apply the chip select signals to the first working memory and the second working memory.

Preferably, but not necessarily, the flash memory may include a first OS area and a second OS area stored with the OS, and the MPU uploads, in the first working memory, the latest versioned OS by comparing versions of OSs respectively stored in the first OS area and the second OS area.

Preferably, but not necessarily, the flash memory may include a first OS area and a second OS area stored with OSs, and the MPU stores OSs downloaded from the PADT on an OS area stored with previous version by comparing versions of OSs respectively stored in the first OS area and the second OS area.

Preferably, but not necessarily, the MPU may download the OS from the PADT by calling a boot program.

In another general aspect of the present disclosure, there is provided a method for updating an OS (Operating System) in a PLC (Programmable Logic Controller), the method comprising:

downloading, by a MPU (Micro Processing Unit), an OS from a PADT (Programming And Debugging Tool);

storing, by the MPU, a downloaded OS on a first OS area or a second OS area stored a previous version OS by comparing versions of OSs respectively stored in the first OS area and the second OS area of a flash memory;

uploading the OS downloaded and stored in the first OS area or the second OS area on a first working memory or a second working memory not stored with OS working on a current work by the MPU in the first working memory and the second working memory; and performing the work, by the MPU, in response to the OS uploaded on the first working memory or the second working memory.

Preferably, but not necessarily, the downloading may be realized by a boot program called by the MPU.

Preferably, but not necessarily, the method may further comprise, subsequent to uploading the OS, applying, to the first working memory or the second working memory, a chip select signal configured to select the first working memory or the second working memory by switching, by a switching unit, in response to a chip switching signal outputted by the MPU.

Preferably, but not necessarily, the chip select signal may be a signal reversing the chip select signal previously outputted for selecting the first working memory or the second working memory.

ADVANTAGEOUS EFFECTS

The apparatus and method for updating the OS in the PLC have an advantageous effect in that
the PLC can be instantly operated by applying a newly versioned OS, instead of turning off and turning on a power of the PLC again, while a newly versioned OS provided by the PADT is downloaded and stored, whereby time for updating the OS and time for the PLC to be operated in response to the updated OS can be reduced and whereby productivity of products manufactured by using the PLC can be improved.

Other exemplary aspects, advantages, and salient features of the disclosure will become more apparent to persons of ordinary skill in the art from the following detailed description, which, taken in conjunction with the annexed drawings, discloses exemplary embodiments of the invention.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinafter by way of illustration only, and thus are not limitative of the present invention, and like numbers refer to like elements throughout,
wherein:

FIGS. 4a and 4b are respectively a detailed circuit diagram of a switching unit of FIG. 3 and a graph showing an operation state;

FIGS. 5a and 5b are graphs illustrating uploading operations, to a working memory, a new versioned OS stored in a flash memory in an apparatus for updating an OS in a PLC according to the present disclosure; and FIG. 6 is a signal flowchart illustrating an operation of MPU according to a method for updating an OS in a PLC according to the present disclosure.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Hereinafter, exemplary embodiments of the present disclosure will be described in detail with reference to the accompanying drawings.

Figure 1:
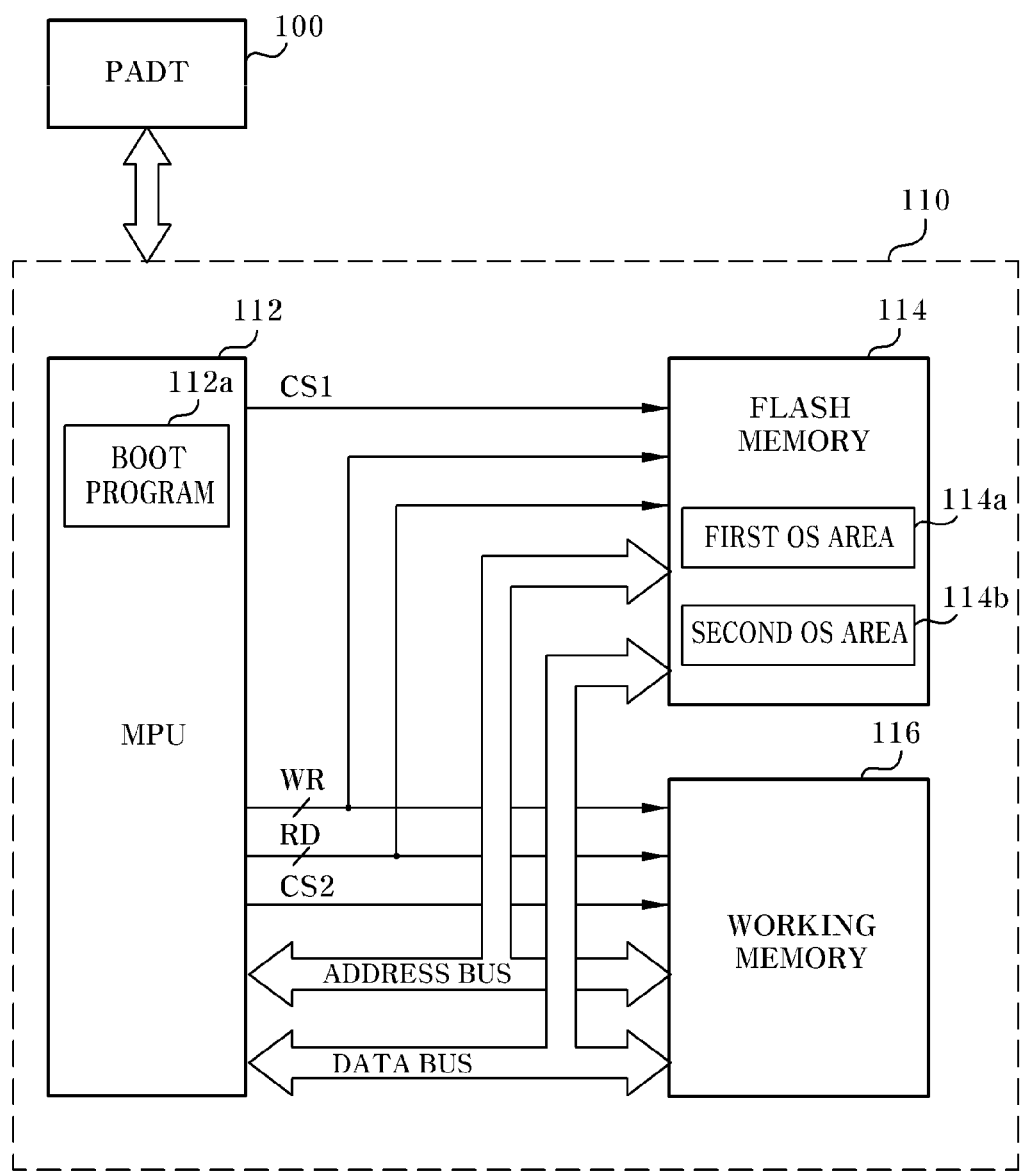
FIG. 1 is a block diagram illustrating a configuration of an apparatus for updating an OS in a PLC according to prior art.

FIG. 1 is a block diagram illustrating a pulse input method of a high speed counter module of PLC according to prior art, where reference numeral 100 is a PADT (Programming And Debugging Tool), and 110 is a PLC.

The PADT (100) generates an operation command in response to manipulation of an operator and provides the operation command to the PLC (110), and when the generated command is a download command of OS, the PADT (100) provides to the PLC (110) the OS that is to be downloaded. The PLC (110) performs a predetermined operation in response to a latest versioned OS among pre-stored OSs, and performs an operation in response to the operation command of the PADT (100).

Furthermore, the PLC (110) downloads the OS provided by the PADT (110) and stores the OS when there is generated a download command of OS. At this time, the PLC (110) may include an MPU (Micro Processing Unit, 112), a flash memory (114) and a working memory (116).

The MPU (112) controls in such a manner that the PLC (110) performs a predetermined work in response to the latest versioned OS among the pre-stored OSs, and performs an operation in response to the operation command of the PADT (100). Furthermore, the MPU (112) calls a boot program (112a) to allow downloading the OS provided by the PADT (100) when the PADT (100) generates a download command of OS, and controls the storage and execution of the downloaded OS.

The flash memory (114) includes a plurality of OS areas, and stores the OS downloaded by the MPU (112). For example, the flash memory (114) may include a first OS area (114a) and a second OS area (114b), where the first and second OS areas (114a, 114b) are selectively stored with the OS provided by the PADT (100) in response to control of the MPU (112). The working memory (116) is stored with the latest versioned OS among the OSs stored in the first and second OS areas (114a, 114b) in response to the control of the MPU (112), and performs a predetermined operation in response to the OS by providing the stored OS to the MPU (112).

In the apparatus for updating the OS in the PLC system thus configured according to the prior art, when the power of the PLC (11 0) is turned on, the MPU (112) checks each version of OS stored in the first and second OS areas (114a, 114b) of the flash memory (114). For example, the MPU (112) generates a chip select signal (CS1) to activate the first and second OS areas (114a, 114b) of the flash memory (114). Furthermore, the MPU (112) generates a read signal (RD) of the flash memory (114) and generates an address signal through an address bus to read OSs respectively stored in the first and second OS areas (114a, 114b), receives the read OSs through a data bus, and compares versions of received OSs to determine the first or second OS areas (114a, 114b) that is stored with the latest versioned OS. At this time, operation will be explained assuming that the latest versioned OS is stored in the first OS area (114a).

When it is determined that the latest versioned OS is stored in the first OS area (114a), the MPU (112) reads out the latest versioned OS stored in the first area (114a) and stored the latest versioned OS in the working memory (116). For example, the MPU (112) generates a read signal (RD) of the flash memory (114) and an address signal while a chip select signal (CS1) is generated to activate the flash memory (114), and allows the latest versioned OS stored in the first OS area (114a) of the flash memory (116) to be outputted through the data bus.

Furthermore, the MPU (112) generates a chip select signal (CS2) and a write signal (RD), and send the generated chip select signal (CS2) and write signal (RD) to the working memory (116), and generates an address signal through an address bus and sends the generated address signal to the working memory (116). Then, the latest versioned OS stored in the first area (114a) of the flash memory (114) is inputted into and stored in the working memory (116) through the data bus.

When the latest versioned OS is stored in the working memory (116) as described above, the MPU (112) reads out the OS stored in the working memory (116) and performs a predetermined work in response to the OS read out from the working memory (116).

The MPU (112) determines whether a predetermined operation command has been received from the PADT (100) while the work is performed in response to the latest versioned OS. When it is determined that the predetermined operation command has been received from the PADT (100), the MPU (112) determines whether the operation command is a download command of new versioned OS, and performs a predetermined operation in response to an inputted relevant operation command when the operation command is not a download command of new versioned OS. The MPU (112) calls a boot program (112a) to allow downloading the new versioned OS provided by the PADT (100) when it is determined that the operation command received from the PADT (100) is a download command of new versioned OS.

Furthermore, the MPU (112) checks the versions of OSs stored in the first and second OS areas (114a, 114b) of the flash memory (114), and when the version of OS stored in the second OS area (114b) is an earlier version than the OS stored in the first OS area (114a), the MPU (112) deletes the OS stored in the second OS area (114b) and stores a new versioned OS downloaded through the boot program (112a) in the second OS area (114b).

When the new versioned OSs downloaded thus described are stored in the second OS area (114b), the MPU (112) turns off the power of PLC (110) and turns on again or performs a system reset.

Furthermore, the MPU (112) checks versions of OSs stored in the first and second OS areas (114a, 114b) of the flash memory (114) in the initialization work when the PLC (110) turns on the power or performs an initialization work in response to the system reset, where it is assumed that the version of OS stored in the second OS area (114b) is later than the version of OS stored in the first OS area (114a). Then, the MPU (112) reads out the OS stored in the second OS area (114b) and stored the read-out OS in the working memory (116), and performs a predetermined work in response to the latest versioned OS stored in the second OS area (114b).

Figure 2:
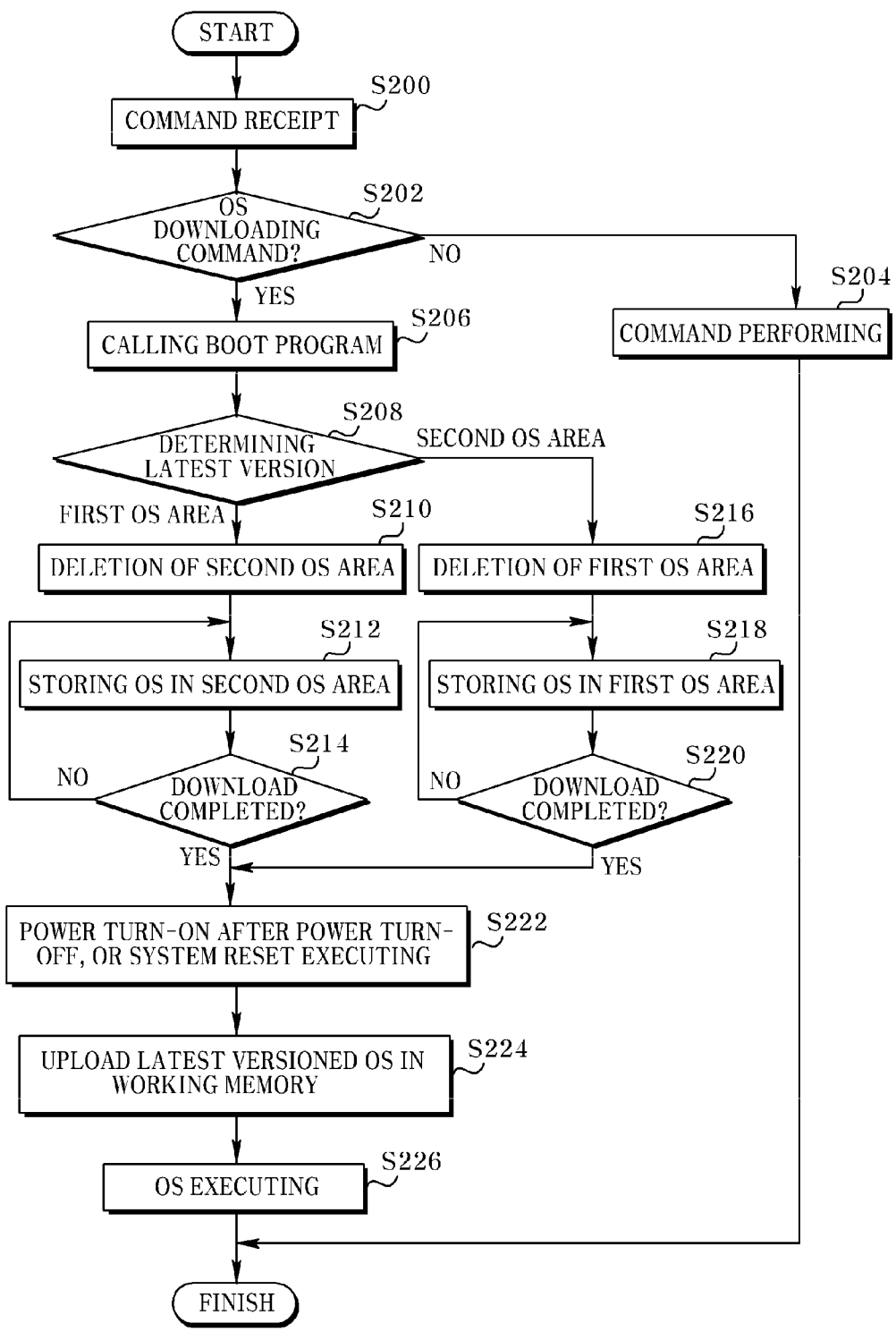
FIG. 2 is a signal flowchart illustrating operations of MPU by a method for updating an OS in PLC according to prior art.

FIG. 2 is a signal flowchart illustrating an operation of MPU by a method for updating an OS in PLC according to prior art. Referring to FIG. 2, the MPU (112) receives a command generated by the PADT (110) (S200), and determines whether the received command is a command that commands the download of the OS (S202).

As a result of determination if the received command is not a command that commands the download of the OS, the MPU (112) performs a predetermined operation in response to the received command (S204). Furthermore, as a result of determination if the received command is a command that commands the download of the OS, the MPU (112) calls the boot program (112a) to enable downloading a latest versioned OS (S206) and determines a latest versioned OS among the OSs respectively stored in the first and second OS areas (114a, 114b) of the flash memory (114) (S208).

As a result of the determination, if it is determined that the version of OS stored in the first OS area (114a) is later than the version of OS stored in the second OS area (114b), the MPU (112) deletes the OS stored in the second OS area (114b) (S210). That is, the MPU (112) deletes a flash sector of the second OS area (114b).

Furthermore, the MPU (112) stores the newly versioned OS received from the boot program (112a) in the second OS area (114b) of the flash memory (114) (S212), and determines if the newly versioned OS is completed in downloading (S214).

As a result of determination, if it is determined that the newly versioned OS is not completed in downloading, the MPU (112) returns to the step (S212) to store the newly versioned OS received from the boot program (112a) in the second OS area (114b) of the flash memory (114), and repeats an operation of determining whether the newly versioned OS has been completed in downloading.

Furthermore, as a result of determination, if it is determined that the version of OS stored in the second OS area (114b) is later than the version of OS stored in the first OS area (114a), the MPU (112) deletes the OS stored in the first OS area (114a) (S216). Then, the MPU (112) stores the newly versioned OS received from the boot program (112a) in the first OS area (114a) of the flash memory (114) (S218), and determines if the new versioned OS is completed in downloading (S220).

As a result of determination, if it is determined that the new versioned OS is not completed in downloading, the MPU (112) returns to the step (S218) to store the newly versioned OS received from the boot program (112a) in the first OS area (114a) of the flash memory (114), and repeats an operation of determining whether the newly versioned OS has been completed in downloading. Under this state, if it is determined that the newly versioned OS has been completed in downloading, the MPU (112) turns off the power of the PLC (11 0) and turns on the power again, or performs the system reset (S222).

Then, the MPU (112) turns on the power of PLC (110) or performs the initialization operation in response to the system reset, and uploads in the working memory (116) the latest versioned OS among the OSs respectively stored in the first and second OS areas (114a, 114b) of the flash memory (114) (S224).

That is, the MPU (112) performs the initialization work and checks the versions of OSs respectively stored in the first and second OS areas (114a, 114b) of the flash memory (114), and reads out the latest versioned OS and uploads the read-out latest versioned OS in the working memory (116). When the upload of the latest versioned OS is completed, the MPU (112) executes the latest versioned OS uploaded on the working memory (116) (S226).

The PLC (110) according to the prior art may store the newly versioned OS provided by the PADT (110) in the flash memory (114) when a command of downloading the OS is generated from the PADT (100) while the MPU (112) executes the current versioned OS. However, in order to execute the newly versioned OS stored in the flash memory (114), the MPU (112) must turn off the power of the PLC (110) and turn on the power again, or execute the system rest to perform the initialization work, and upload the newly versioned OS in the working memory (116) while performing the initialization work. Thus, it takes much time until the MPU (112) executes the downloaded newly versioned OS, resulting in generation of problem of decreased productivity of the products.

Figure 3:
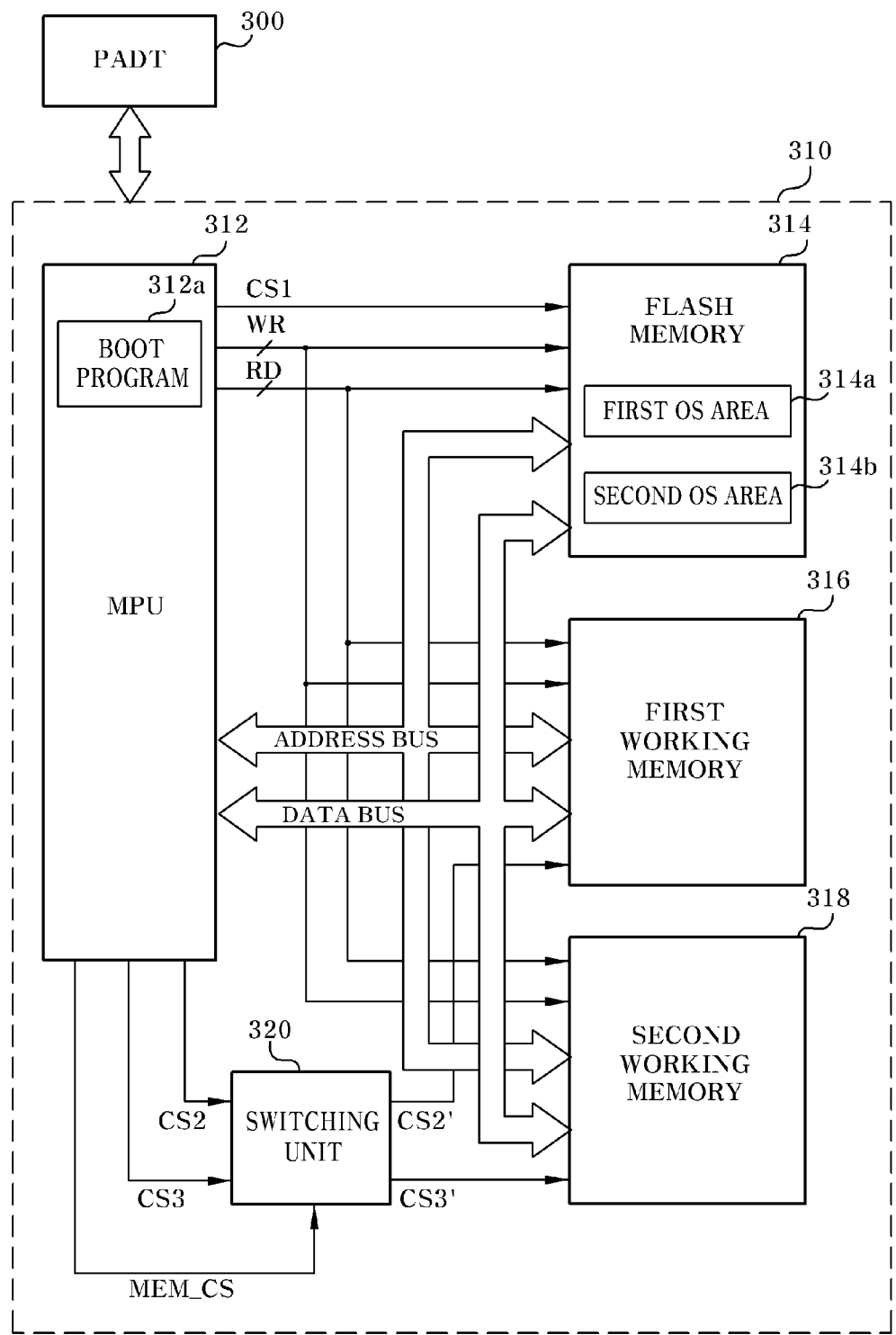
FIG. 3 is a block diagram illustrating a configuration of an apparatus for updating an OS in a PLC according to the present disclosure.

FIG. 3 is a block diagram illustrating a configuration of an apparatus for updating an OS in a PLC according to the present disclosure, where reference numeral 300 is a PADT and 310 is a PLC.

The PADT (300) generates an operation command in response to manipulation of an operator and provides the operation command to the PLC (310), and provides an OS to be downloaded by the PLC (310) when the generated command is a command of downloading an OS. The PLC (310) performs a predetermined operation in response to a latest versioned OS among a pre-stored OSs. Furthermore, the PLC (310) downloads the OS provided by the PADT (300) and stores the downloaded OS when the PADT (300) generates a command of downloading the OS.

The PLC (310) may include an MPU (Micro Processing Unit, 312), a flash memory (314), a first working memory (316) and a second working memory (318), and a switching unit (320).

The MPU (312) controls in such a manner that the PLC (310) performs a predetermined operation in response to the latest versioned OS among pre-stored OSs, and performs an operation in response to an operation command of the PADT (300). Furthermore, the MPU (312) calls a boot program (312a) when the PADT (300) generates a command of downloading an OS to enable downloading the OS to be provided by the PADT (300), and controls storage and execution of the downloaded OS.

The flash memory (314) may include first and second OS areas (314a, 314b), for example, where the first and second OS areas (314a, 314b) may be selectively stored with OSs provided by the PADT (300) in response to the control of the MPU (312).

One of the first and second working memories (316, 318) may be selected in response to control of the MPU (312), and may be stored with the latest versioned OS among the OSs stored in the first and second OS areas (314a, 314b), and may perform a predetermined operation by providing the stored OS to the MPU (312).

Furthermore, one of the first and second working memories (316, 318) is selected in response to control of the MPU (312), when the newly versioned OS is updated to be stored in the flash memory (314), whereby the updated newly versioned OS is uploaded. The switching unit (320) switches chip select signals (CS2, CS3) generated by the MPU (312) in response to a chip switching signal (MEM_CS) generated by the MPU (312) to thereby generate a chip select signal (CS2') of the first working memory (316) and a chip select signal (CS3') of the second working memory (318).

The apparatus for updating OS in PLC according to the present disclosure thus configured is such that when power of the PLC (310) is turned on, the MPU (312) checks each version of OSs stored in the first and second OS areas (314a, 314b) of flash memory (314), where operation is explained with an assumption that the first OS area (314a) is stored with the latest versioned OS.

If it is determined that the first OS area (314a) is stored with the latest versioned OS, the MPU (312) reads out the latest versioned OS stored in the first OS area (314a) and selectively stores the latest versioned OS in the first working memory (316) or the second working memory (318).

Now, operation will be explained with an assumption that the first working memory (316) is stored with the latest versioned OS.

The MPU (112) generates a read signal (RD) and an address signal of the flash memory (314) while a chip select signal (CS1) is generated to activate the flash memory (314), to allow the flash memory (314) to output the latest versioned OS stored in the first OS area (314a) through the data bus.

Furthermore, the MPU (312) generates a chip select signal (CS2) and outputs a chip switch signal (MEM_CS) of logic 1 signal, and enables the first working memory (316) to be activated by allowing the chip select signal (CS2) to be outputted as a chip select signal (CS2') through the switching unit (320) in response to the outputted chip switch signal (MEM_CS) of a logic 1 signal. In addition, the MPU (312) generates a read signal (RD) of the first working memory (316) and also generates an address signal through the address bus. Then, the latest versioned OS outputted through the data bus from the first OS area (314a) of the flash memory (314) is inputted to the first working memory (316) and uploaded.

When the latest versioned OS is uploaded on the first working memory (316) as explained above, the MPU (312) reads out the OS uploaded on the first working memory (316) and performs a predetermined operation in response to the OS read out from the first working memory (316).

The MPU (112) determines whether a predetermined operation command has been received from the PADT (300) while the MPU (312) performs the operation in response to the latest versioned OS. When the predetermined operation command is inputted from the PADT (300), the MPU (312) determines whether the predetermined command is a command to download a newly versioned OS, and performs a predetermined operation in response to a relevant operation command when the predetermined command is not a command to download a newly versioned OS.

When the operation command inputted from the PADT (300) is a command to download a new versioned OS, the MPU (312) calls the boot program (312a) to download the newly versioned OS provided by the PADT (300). Furthermore, the MPU (312) checks versions of OSs stored in the first and second OS areas (314a, 314b) of the flash memory (314), and when the version of the OS stored in the second OS area (314b) is an earlier version than that of the first OS area (314a), the MPU (312) deletes the OS stored in the second OS area (314b) and stores a newly versioned OS downloaded through the boot program (312a) in the second OS area (314b).

When the newly versioned OSs are all stored in the second OS area (314b) as described above, the MPU (312) generates a chip select signal (CS3), where the generated chip select signal (CS3) is outputted as the chip switching signal (CS2') through the switching unit (320) in response to the chip switch signal (MEM_CS) of a logic 1 signal to activate the second working memory (318). Furthermore, the MPU (312) reads out a newly versioned OS stored in the second OS area (314b) and uploads the newly versioned OS in the second working memory (318).

When the second working memory (318) is uploaded with all the newly versioned OSs stored in the second OS area (314b), the MPU (312) does not output the chip select signal (CS3) but outputs the chip switching signal (MEM_CS) as logic 0. Then, the switching unit (320) activates the second working memory (317) by outputting the chip select signal (CS2) as chip select signal (CS3') in response to the logic 0 of chip switching signal (MEM_CS), whereby the MPU (312) can perform a predetermined operation in response to the newly versioned OS uploaded on the second working memory (317).

FIGS. 4a and 4b are respectively a detailed circuit diagram of a switching unit of FIG. 3 and a graph showing an operation state.

Referring to FIG. 4a, the switching unit (320) of the present disclosure enables each chip select signal (CS2', CS3') to be outputted from output terminals of buffers (BF1, BF3)(BF2, BF4) by allowing the chip select signals (CS2, CS3) to be applied and connected to input terminals of the buffers (BF1, BF3)(BF2, BF4). Furthermore, the chip switching signal (MEM_CS) is applied and connected to a non-inverting control terminal of the buffers (BF1, BF3) and the chip switching signal (MEM_CS) is applied and connected to a inverting control terminal of the buffers (BF2, BF4).

The switching unit (320) thus configured according to the present disclosure is such that the buffers (BF1, BF3) operate when the chip switching signal (MEM_CS) is logic 1 but the buffers (BF2, BF4) do not operate. Then, the chip select signals (CS2, CS3) are respectively outputted as chip select signal (CS2', CS3') through the buffers (BF1, BF3), as shown in FIG. 4b, to be respectively applied to the first and second working memories (316, 318).

The buffers (BF1, BF3) do not operate when the chip switching signal (MEM_CS) is logic 0 but the buffers (BF2, BF4) operate. Then, the chip select signals (CS2, CS3) are respectively outputted as chip select signal (CS2', CS3') through the buffers (BF2, BF4), as shown in FIG. 4b, to be respectively applied to the first and second working memories (316, 318).

Thus, as explained above, while the chip select signal (CS2) is generated to activate the first working memory (316) and operation is performed in response to the OS stored in the first working memory (316), the MPU (312) activates the second working memory (318) by reverting the chip switching signal (MEM_CS) and performs the operation in response to the OS stored in the second working memory (318).

FIGS. 5a and 5b are graphs illustrating uploading operations, to a working memory, a new versioned OS stored in a flash memory in an apparatus for updating an OS in a PLC according to the present disclosure.

Referring to FIGS. 5a and 5b, when the current OS operating areas are 0x200000~0x2FFFFF, the MPU (312) selects a working memory by using the chip select signal (CS2). At this time, when the MPU (312) outputs the chip switching signal (MEM_CS) in logic 1, the chip select signal (CS2) is outputted as the chip select signal (CS2') through the switching unit (320), whereby the first working memory (316) is selected, and when the MPU (312) outputs the chip switching signal (MEM_CS) in logic 0, the chip select signal (CS2) is outputted as the chip select signal (CS3') through the switching unit (320), whereby the second working memory (318) is selected.

A newly versioned OS that is downloaded in response to an OS downloading command of PADT (300) is stored in the flash memory (314). At this time, each version of OSs stored in the first and second OS areas (314a, 314b) is checked by the MPU (312), and the downloaded newly versioned OS is stored in an area where low versioned OS is stored.

For example, when version of OS stored in the first OS area (314a) is V1.0, and version of OS stored in the second OS area (314b) is V1.1, the MPU (312) deletes the OS stored in the first OS area (314a) and stores the downloaded newly versioned OS. When the storage of downloaded newly versioned OS is completed, the newly versioned OS stored in the first OS area (314a) is uploaded as 0x300000~0x3FFFFF in the working memory, and a working memory uploaded with the newly versioned OS is selected in response to the chip select signal (CS3).

For example, when the MPU (312)-operated current OS is uploaded on the first working memory (316), the second working memory (318) is selected to upload the newly versioned OS, and when the MPU (312)-operated current OS is uploaded on the second working memory (318), the first working memory (316) is selected to upload the newly versioned OS.

When the newly versioned OS is completed in uploading and the chip switching signal (MEM_CS) is reversed and outputted by the MPU (312), a working memory stored with the newly versioned OS is activated to allow the OS stored in the MPU (312) to be provided.

FIG. 6 is a signal flowchart illustrating an operation of MPU according to a method for updating an OS in a PLC according to the present disclosure.

Referring to FIG. 6, the MPU (312) receives a command generated by the PADT (310) (S600), and determines whether the received command is a command of downloading the OS (S602). As a result of the determination, if the received command is not a command to download the OS, the MPU (312) performs a predetermined operation in response to the received command (S604). As a result of the determination, if the received command is a command to download the OS, the MPU (312) calls the boot program (312a) to allow downloading a newly versioned OS (S606), and determines a latest versioned OS among the OSs respectively stored in the first and second OS areas (314a, 314b) (S608).

As a result of the determination, if the version of OS stored in the first OS area (314a) is later than that of the second OS area (314b), the MPU (312) deletes the OS stored in the second OS area (314b) (S610). Then, the MPU (312) stores the newly versioned OS received from the boot program (312a) in the second OS area (314b) (S612), and determines whether download of the newly versioned OS is completed (S614).

When the newly versioned OS is completed in downloading, the MPU (312) returns to S612 to store a newly versioned OS received through the boot program (312a) in the second OS area (314b) of the flash memory (312), and to repeat the operation of checking if the newly versioned OS is completed in downloading. Furthermore, as a result of determination at Step S608, if the version of OS stored in the second OS area (314b) is later than that of the first OS area (314a), the MPU (312) deletes the OS stored in the first OS area (314a) (S616). Then, the MPU (312) stores the newly versioned OS received from the boot program (312a) in the first OS area (314a) (S618), and determines whether download of the newly versioned OS is completed (S620).

When the newly versioned OS is not completed in downloading, the MPU (312) returns to S618 to store a newly versioned OS received through the boot program (312a) in the first OS area (314a) of the flash memory (312), and to repeat the operation of checking if the newly versioned OS is completed in downloading.

When the newly versioned OS is completed in downloading, the MPU (312) selects the second working memory (318) when one of the currently not working memories, that is, the first working memory (316), between the first and second working memories (316, 318), is stored with the MPU (312) currently operating OS, to upload the newly versioned OS (S622) and reverses and outputs the chip switching signal (MEM_CS).

Then, the second working memory (318) stored with the newly versioned OS is activated to allow providing the stored newly versioned OS to the MPU (312) (S624).

The above-mentioned apparatus and method for updating OS in PLC according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. An apparatus for updating an OS (Operating System) in a PLC (Programmable Logic Controller), the apparatus comprising:
    an MPU (Micro Processing Unit) downloading a plurality of OSs from a PADT (Programming And Debugging Tool) and performing an operation in response to the one of the downloaded OSs;
    a flash memory storing the plurality of downloaded OSs, wherein the flash memory includes a first OS area and a second OS area;
    a first working memory separate from and independent of the flash memory, wherein the first working memory stores a latest version of the plurality of OSs previously stored in the flash memory;
    a second working memory separate from and independent of the flash memory, wherein the second working memory stores a newly versioned OS in the flash memory subsequent to the first working memory storing the latest version of the plurality of OSs; and
    a switching unit configured to switch a chip select signal received from the MPU for selecting the first working memory or the second working memory in response to a chip switching signal received from the MPU and to apply the switched chip select signal to the first working memory and the second working memory, wherein switching the chip select signal reverses a previously applied chip select signal,
    wherein the PLC is operated by applying the newly versioned OS in the second working memory after the PLC was operated by applying the latest version of the plurality of OSs, wherein a switch of the operation of the PLC from the latest version of the plurality of OSs to the newly versioned OS is carried out without recycling power of the PLC,
    wherein the chip switching signal comprises a logic 1 signal and a logic 0 signal,
    wherein the chip select signal of the MPU comprises a first chip select signal and a second chip select signal,
    wherein the switching unit comprises:
        a first buffer and a second buffer configured to receive the first chip select signal of the MPU; and
        a third buffer and a fourth buffer configured to receive the second chip select signal of the MPU,
    wherein the chip switching signal outputted from the MPU is configured to be inputted to a non-inverting control terminal of the first buffer, a non-inverting control terminal of the third buffer, an inverting control terminal of the second buffer, and an inverting control terminal of the fourth buffer,
    wherein the first buffer and the fourth buffer are configured to output a chip select signal of the first working memory, wherein the chip select signal of the first working memory is configured to activate the first working memory, and
    wherein the second buffer and the third buffer are configured to output a chip select signal of the second working memory, wherein the chip select signal of the second working memory is configured to activate the second working memory.

2. The apparatus of claim 1, wherein the MPU stores the latest version of the plurality of OSs in the first working memory by comparing versions of OSs stored in each of the first OS area and second OS area.

3. The apparatus of claim 1, wherein the MPU stores the plurality of OSs downloaded from the PADT in an OS area of the flash memory that stores a previous version of the plurality of OSs by comparing versions of OSs stored in each of the first OS area and second OS area.

4. The apparatus of claim 1, wherein downloading the plurality of OSs from the PADT comprises calling a boot program.

5. A method for updating an OS (Operating System) in a PLC (Programmable Logic Controller), the method performed by an MPU (Micro Processing Unit) and comprising:
    downloading a plurality of OSs from a PADT (Programming And Debugging Tool);
    storing the plurality of downloaded OSs in a flash memory, wherein the flash memory includes a first OS area and a second OS area;
    storing a latest version of the plurality of OSs previously stored in the flash memory in a first working memory;
    storing a newly versioned OS stored in the flash memory in a second working memory subsequent to storing the latest version of the plurality of OSs in the first working memory, wherein the first working memory and the second working memory are separate from and independent of the flash memory; and
    switching, via a switching unit, a chip select signal from the MPU for selecting the first working memory or the second working memory in response to a chip switching signal; and
    applying the switched chip select signal to the first working memory and the second working memory, wherein switching the chip select signal reverses a previously applied chip select signal,
    wherein the PLC is operated by applying the newly versioned OS in the second working memory after the PLC was operated by applying the latest version of the plurality of OSs, wherein a switch of the operation of the PLC from the latest version of the plurality of OSs to the newly versioned OS is carried out without recycling power of the PLC, wherein the chip switching signal comprises a logic 1 signal and a logic 0 signal, wherein the chip select signal of the MPU comprises a first chip select signal and a second chip select signal, wherein the switching unit comprises:
- a first buffer and a second buffer configured to receive the first chip select signal of the MPU; and
- a third buffer and a fourth buffer configured to receive the second chip select signal of the MPU, wherein the chip switching signal is configured to be inputted to a non-inverting control terminal of the first buffer, a non-inverting control terminal of the third buffer, an inverting control terminal of the second buffer, and an inverting control terminal of the fourth buffer, wherein the first buffer and the fourth buffer are configured to output a chip select signal of the first working memory, wherein the chip select signal of the first working memory is configured to activate the first working memory, and wherein the second buffer and the third buffer are configured to output a chip select signal of the second working memory, wherein the chip select signal of the second working memory is configured to activate the second working memory.

6. The method of claim 5, wherein downloading the plurality of OSs from the PADT comprises calling a boot program.

7. The method of claim 5, wherein storing the latest version of the plurality of OSs in the first working memory comprises comparing versions of OSs stored in each of the first OS area and second OS area.

8. The method of claim 5, wherein the plurality of OSs downloaded from the PADT are stored in an OS area of the flash memory that stores a previous version of the plurality of OS by comparing versions of OSs stored in each of the first OS area and second OS area.

* * * * *